(12) United States Patent
Ostrander et al.

(10) Patent No.: US 6,935,254 B2
(45) Date of Patent: Aug. 30, 2005

(54) SPLIT SEED HOPPERS FOR SEED ON DEMAND SEEDING MACHINE

(75) Inventors: Jeremy Shane Ostrander, Hudson, IL (US); Ronald Lee Pratt, Taylor Ridge, IL (US); Bradley John Meyer, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/214,962

(22) Filed: Aug. 8, 2002

(65) Prior Publication Data

US 2004/0025766 A1 Feb. 12, 2004

(51) Int. Cl.[7] ................................................ A01C 7/00
(52) U.S. Cl. ..................... 111/174; 111/925; 111/57; 111/54; 111/63; 172/311; 172/456
(58) Field of Search ................. 111/174, 186, 111/179, 925, 54, 57, 62, 63, 66; 172/311, 452, 456

(56) References Cited

U.S. PATENT DOCUMENTS

| | | | | | |
|---|---|---|---|---|---|
| 307,103 | A | * | 10/1884 | Dahn ........................... | 239/142 |
| 3,809,316 | A | * | 5/1974 | Dreyer ......................... | 239/167 |
| 3,982,773 | A | * | 9/1976 | Stufflebeam et al. ......... | 280/656 |
| 4,137,852 | A | * | 2/1979 | Pratt ............................ | 111/57 |
| 4,379,664 | A | * | 4/1983 | Klein et al. .................. | 406/68 |
| 4,425,857 | A | * | 1/1984 | Lienemann et al. .......... | 111/14 |
| 4,541,549 | A | * | 9/1985 | Hadley et al. ............... | 222/143 |
| 4,562,779 | A | * | 1/1986 | Briggs ......................... | 111/173 |
| 4,726,303 | A | * | 2/1988 | Degelman et al. ............ | 111/52 |
| 5,156,102 | A | | 10/1992 | Andersen ..................... | 111/175 |
| 5,161,473 | A | | 11/1992 | Landphair et al. ........... | 111/176 |
| 5,392,722 | A | | 2/1995 | Snipes et al. ................ | 111/174 |
| 5,406,897 | A | | 4/1995 | Pingry .......................... | 111/59 |
| 5,601,209 | A | * | 2/1997 | Barsi et al. .................. | 221/266 |
| 5,740,746 | A | | 4/1998 | Ledermann et al. ......... | 111/174 |
| 5,915,313 | A | | 6/1999 | Bender et al. ............... | 111/178 |
| 5,927,217 | A | * | 7/1999 | Halford et al. .............. | 111/174 |
| 5,947,040 | A | * | 9/1999 | Gregor ......................... | 111/174 |
| 6,047,652 | A | | 4/2000 | Prairie et al. ................ | 111/174 |
| 6,065,410 | A | * | 5/2000 | Dunham et al. ............. | 111/200 |
| 6,076,613 | A | * | 6/2000 | Frasier ......................... | 172/311 |
| 6,079,340 | A | * | 6/2000 | Flamme et al. .............. | 111/178 |
| 6,298,797 | B1 | | 10/2001 | Mayerle et al. .............. | 111/175 |
| 6,502,645 | B1 | * | 1/2003 | Brueggen et al. ............ | 172/311 |

OTHER PUBLICATIONS

Farm Forum Advertisement, "Productive Equipment Systems", p. 25, Spring 2002.

* cited by examiner

*Primary Examiner*—Victor Batson

(57) ABSTRACT

A seeding machine comprising a transversely extending main frame and left and right transversely extending wing frames. The main frame and the wing frames are provided with a plurality of planting units. Left and right main seed hoppers are mounted to the main frame. The left and right main seed hoppers are transversely separated from one another by a longitudinally extending gap located along the longitudinal centerline of the seeding machine. A pneumatic seed on demand delivery system automatically directs seed from the left and right main seed hoppers to the planting units. A walkway is positioned in the gap between the left and right main seed hoppers to facilitate operator access to the lids of the main seed hoppers.

20 Claims, 4 Drawing Sheets

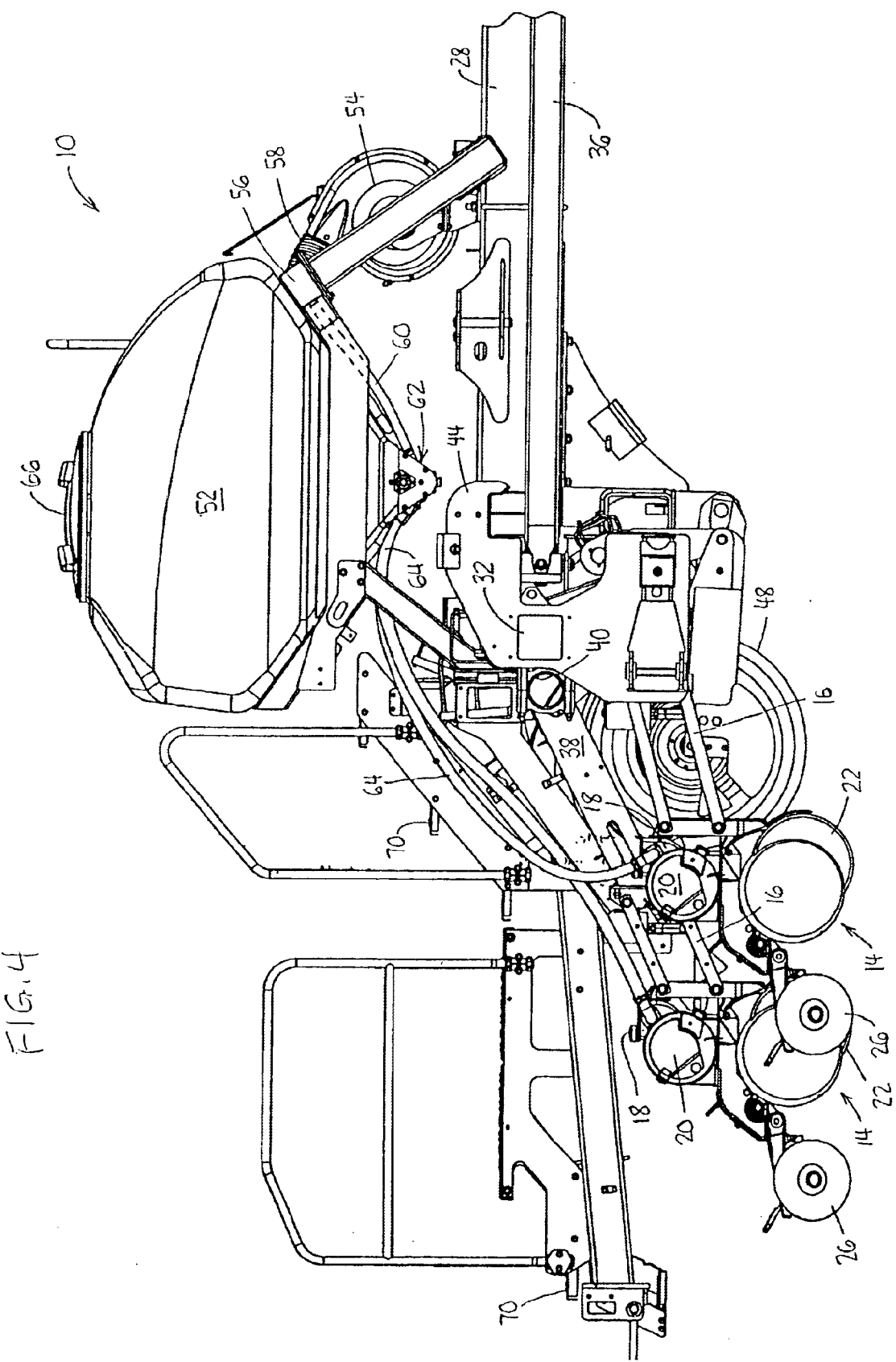

SPLIT SEED HOPPERS FOR SEED ON DEMAND SEEDING MACHINE

FIELD OF THE INVENTION

The present invention is directed to a seeding machine having a pneumatic seed on demand delivery system for directing seed from two main seed hoppers to individual planting units, wherein the main seed hoppers are separated by a gap along the longitudinal centerline of the seeding machine.

BACKGROUND OF THE INVENTION

Seeding machines typically are provided with a transversely extending main frame having transversely extending left and right wing frames. The main frame is provided with a forwardly extending drawbar for attachment to a tractor. Planting units may be transversely distributed along the main frame and the left and right wing frames. The wing frames are normally folded to reduce the transverse width of the seeding machine during transport. In some seeding machine configurations the wing frames are forwardly folded substantially parallel to the drawbar for reducing the transverse width. The individual planting units are typically provided with seed hoppers for holding the seed to be planted. The seed is typically loaded into the planting unit seed hoppers one at a time by the operator. Some seeding machines having planting units are provided with pneumatic seed on demand delivery systems in which the planting unit seed hoppers are automatically refilled with seed as needed from a main hopper.

Pneumatic seed on demand delivery systems automatically direct seed from a main seed hopper to a plurality individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed.

Pneumatic seed on demand seeding machines typically have a large central seed hopper that supplies seed to all of the auxiliary hoppers on the planting units. The main seed hopper and pneumatic seed on demand distribution system may be located on a trailing cart or on the main frame itself.

SUMMARY OF THE INVENTION

It is an object of the present invention to provide a seeding machine having left and right main seed hoppers that are separated by a longitudinally extending gap along the longitudinal centerline of the seeding machine to facilitate maintenance, visibility and loading of the main seed hoppers.

A seeding machine comprising a transversely extending main frame, left and right main seed hoppers are mounted to the main frame, a plurality of planting units are mounted to the main frame, and a seed on demand delivery system directs seed from the left and right main seed hoppers to the planting units. Each of the planting units is provided with an auxiliary seed hopper that is pneumatically coupled to the left or right main seed hopper by the seed on demand delivery system. Each planting unit is also provided with a seed meter for metering seed from the auxiliary seed hopper and directing the metered seed to a planting furrow formed by a furrow opener extending from the planting unit. A longitudinally extending transverse gap is formed between the left and right main seed hoppers. A walkway is positioned in this gap to facilitate operator access to the lids of the main seed hoppers and also provide for a visual channel through the seeding machine.

The hoppers may be loaded with identical seed or two different seed varieties. By manipulating the product lines of the pneumatic seed on demand delivery system which seed variety is directed to which planting unit is controlled. If the same seed variety is placed in both main seed hoppers, the product lines for the left main seed hopper may be directed to the planting units located on the left side of the seeding machine, and the product lines for the right main seed hopper may be directed to the right side planting units on the seeding machine. If different seed varieties are placed in the main seed hoppers, the left side planting units can plant one seed variety and the right side planting units can plant the other seed variety. Of course other planting configurations could be made by rearranging the product lines.

BRIEF DESCRIPTION OF THE DRAWINGS

FIG. 4 is a side view of the seeding machine.

DETAILED DESCRIPTION

Figure 1:
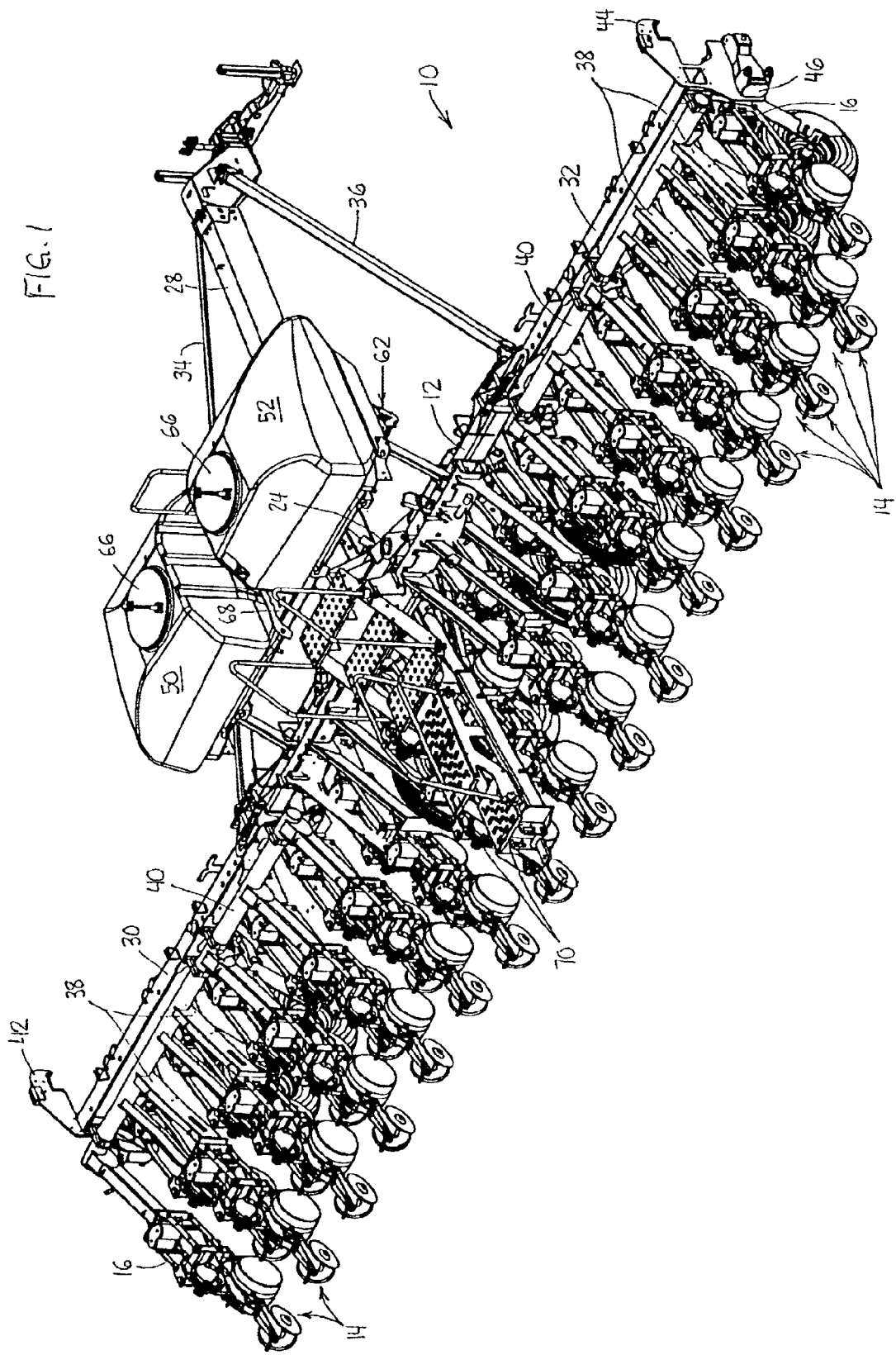
FIG. 1 is a rear perspective view of the seeding machine of the present invention in its working position.

An agricultural seeding machine 10 comprises a central main frame 12 on which are mounted a plurality of individual planting units 14. The planting units 14 are coupled to the central main frame 12 by a parallelogram linkage 16 so that the individual planting units 14 can move up and down to a limited degree relative to the frame 12. Each of the individual planting units 14 (best illustrated in FIG. 4) comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter 20 by a seed tube. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention.

Figure 2:
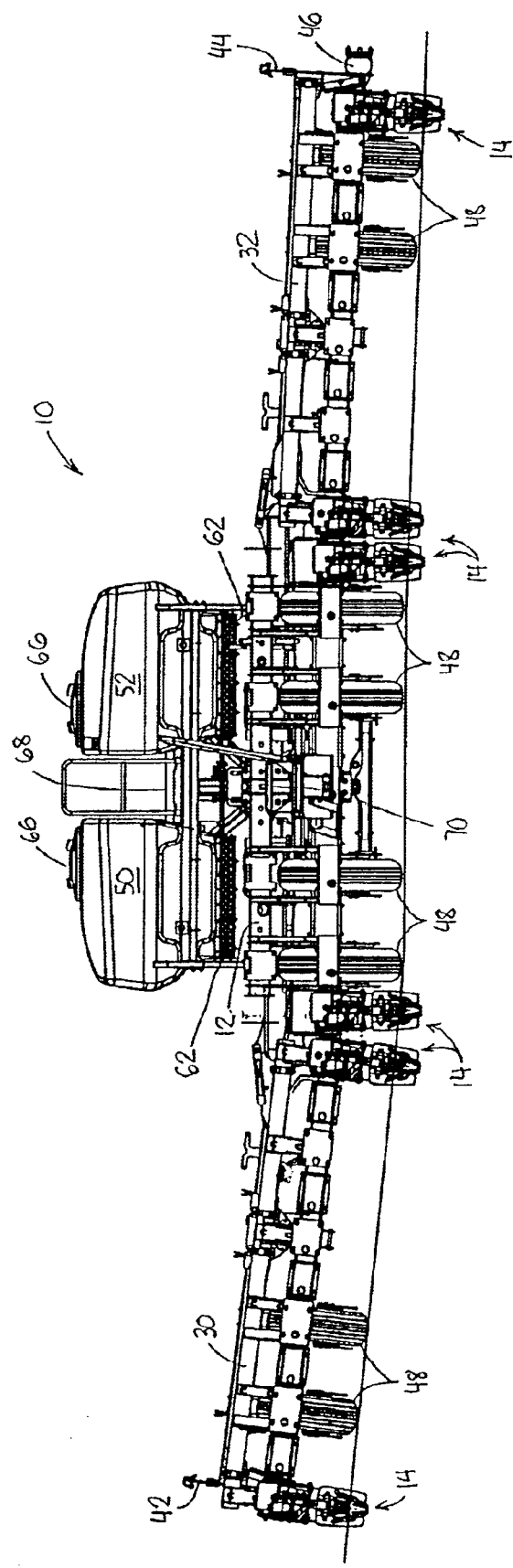
FIG. 2 is a rear view of the seeding machine in its working position.
Figure 3:
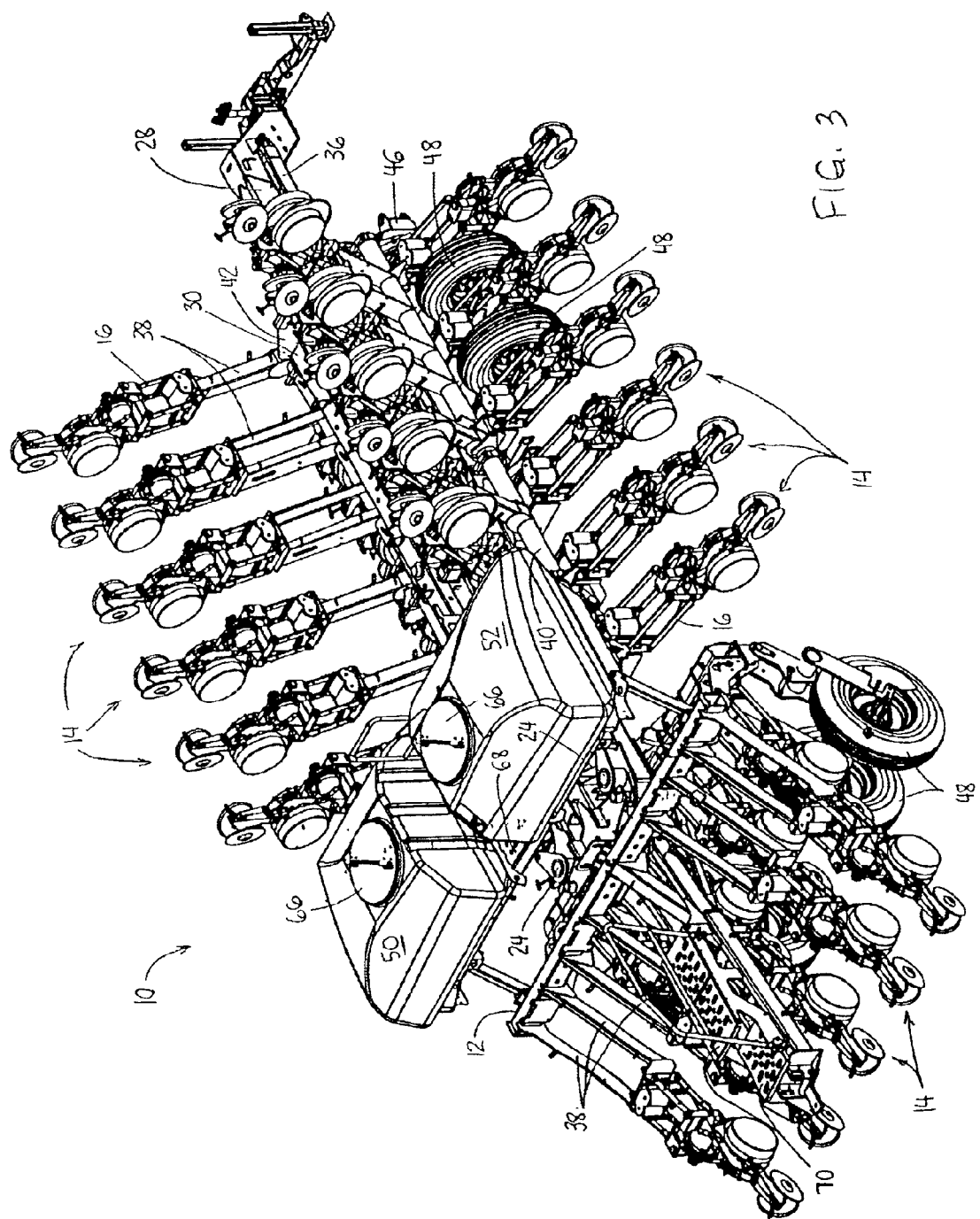
FIG. 3 is a rear perspective view of the seeding machine of the present invention in its transport position.

The central main frame 12 extends transversely to the direction of travel. The central main frame 12 is coupled to a tractor by a telescoping drawbar 28. In the illustrated embodiment, the drawbar 28 defines the longitudinal centerline of the seeding machine. The longitudinal centerline is perpendicular to the transversely extending central main frame 12. Left and right wing frames 30 and 32 extend transversely outward from the central main frame 12 when the seeding machine is in its working position illustrated in FIGS. 1 and 2. Left and right wing frames 30 and 32 are coupled to the drawbar 28 by left and right links 34 and 36. These wing frames 30 and 32 are pivotally coupled to the main frame by vertical pivots 24, so they can be forwardly folded into the seeding machine's transport position illustrated in FIG. 3. The wing frames 30 and 32 are also pivotally coupled to the central main frame 12 by a horizontal pivot so the wing frames 30 and 32 better follow the ground as illustrated in FIG. 2. It should be noted that a number of individual planting units 14 have been eliminated from FIG. 2 for clarity purposes.

The individual planting units 14 are arranged in two ranks. A front rank and a rear rank. The individual row units alternate between the front rank and the rear rank. The front and rear ranks of planting units are directly mounted to the central main frame 12. The rear rank of planting units mounted to the wing frames 30 and 32 are mounted to rearwardly extending arms 38 that are coupled to a pivotal hollow tube 40 forming a rock shaft. In this way the rear rank of wing frame row units can be pivoted upwardly on their noses for transport, see FIG. 3. The front rank of wing frame row units are directly mounted to the wing frames 30 and 32.

The transverse ends of the wing frames 30 and 32 are provided with left and right hooks 42 and 44 for hooking to the telescoping draw bar 28 when the seeding machine is in its transport position. Row marker mounting brackets 46 are also located on the transverse ends of the wing frames 30 and 32. The row markers themselves have been eliminated or clarity purposes. The central main frame 12 and the wing frame 30 and 32 are provided with ground support wheels 48. The ground support wheels 48 are mounted to linkages having hydraulic cylinders that can be extended and retracted to raise and lower the planting units 14 relative to the ground. In the seeding machine's 10 transport position illustrated in FIG. 3, the ground support wheels 48 extending from the central main frame 12 are the only ground support wheels 48 in contact with the ground, the wing frame ground support wheels 48 being lifted with the wing frames 30 and 32.

Left and right main seed hoppers 50 and 52 are mounted to the central main frame 12. An air pump 54 directs a pressurized air stream to a manifold formed from a horizontal hollow closed tubular support 56. The air pump 54 is driven by a hydraulic motor, however other motor arrangements could be used, like electric motors for driving the air pump. The air pump 54 directs the pressurized air stream to the manifold 56 through main air hose 58. The manifold 56 is provided with a plurality of manifold outlets corresponding to the number of planting units 14 mounted to the central frame 12 and the two wing frames 30 and 32. Individual air supply lines 60 extend from the manifold outlets and direct pressurized air from the manifold 56 to the nozzle assemblies 62. Nozzle assemblies 62 are located on the bottoms of the left and right main seed hopper 50 and 52. Seed located in the seed hoppers 50 and 52 flows by gravity to the nozzle assemblies 62. The downstream sides of the nozzle assemblies 62 are coupled to product supply hoses 64 that extend from the nozzle assemblies 62 to the individual auxiliary seed hoppers 18 for directing seed entrained in the air stream from the nozzle assemblies 62 to the auxiliary seed hoppers 18. Vents are formed in the auxiliary seed hoppers 18 to vent excess air. Please note the product supply hoses 64 have been deleted from FIGS. 1, 2 and 3 for illustration purposes.

Seed is placed in the left and right main seed hopper 50 and 52 through lids 66. Access to the lids 66 is gained from walkway 68 located between the two hoppers 50 and 52. The walkway 68 is reached from steps 70 extending rearwardly from the walkway 68. The walkway 68 and steps 70 lie along the longitudinal centerline of the seeding machine 10. The walkway 68 is located in a gap formed between the two seed hoppers 50 and 52. This longitudinally extending gap while providing ready access to the lids 66 also provides a visual channel for the operator looking rearwardly from the tractor. The upper stairs 70 in FIG. 3 have been eliminated for illustration purposes.

Having described the preferred embodiment, it will become apparent that various modifications can be made without departing from the scope of the invention as defined in the accompanying claims.

We claim:

1. A seeding machine comprising:
   a drawbar defining a longitudinal centerline;
   a transversely extending main frame, the main frame is provided with a plurality of planting units, each planting unit comprises an auxiliary hopper for holding seed, a seed meter for metering seed contained in the auxiliary hopper and a furrow opener for forming a planting furrow into which seed metered by the seed meter is deposited;
   left and right main seed hoppers for holding seed are mounted to the main frame, the left and right main seed hoppers are transversely separated from one another by a gap along the longitudinal centerline, the gap is provided with a longitudinally extending walkway along the longitudinal center line between the left and right main seed hoppers;
   a pneumatic seed on demand delivery system automatically directs seed from the left and right main seed hoppers to the auxiliary seed hoppers of the planting units as needed.

2. A seeding machine as defined by claim 1 wherein the walkway is accessible from behind the planting units.

3. A seeding machine as defined by claim 1 wherein the main frame is provided with the left and right wing frames, the left and right wing frames are also provided with planting units having auxiliary hoppers that are supplied seed from the left and right main seed hoppers by the pneumatic seed on demand delivery system.

4. A seeding machine as defined by claim 3 wherein the left main seed hopper supplies seed to the planting units on the left wing frame and the right main seed hopper supplies seed to the planting units on the right wing frame.

5. A seeding machine as defined by claim 4 wherein each planting unit is coupled to the main frame, the left wing frame and the right wing frame by a linkage that permits limited up and down movement of the planting unit relative to the frame to which the planting unit is mounted.

6. A seeding machine as defined by claim 5 wherein said seeding machine has a working position and a transport position, the main frame has a forwardly extending telescoping drawbar, in the seeding machine's working position the left and right wing frames extend transversely outward from the main frame, in the seed machine's transport position the left and right wing frames extend forwardly from the main frame substantially parallel to the drawbar.

7. A seeding machine as defined by claim 6 wherein the main frame is provided with main ground support wheels that are raised and lowered relative to the main frame, the main ground support wheels are lowered to raise the seeding machine into its transport position, when the main ground support wheels are raised the seeding machine is lowered into its working position.

8. A seeding machine as defined by claim 7 wherein the left and right wing frames are each provided with a ground support wheel.

9. A seeding machine as defined by claim 8 wherein steps extend rearwardly from the walkway.

10. A seeding machine as defined by claim 9 wherein the left and right main seed hoppers are provided with lids that can be accessed from the walkway.

11. A seeding machine as defined by claim 2 wherein the main frame is provided with a forwardly extending drawbar that lies along the longitudinal centerline of the main frame.

12. A seeding machine as defined by claim 11 wherein the main frame is provided with the left and right wing frames, the left and right wing frames are also provided with planting units having auxiliary hoppers that are supplied seed from the left and right main seed hoppers by the pneumatic seed on demand delivery system.

13. A seeding machine as defined by claim 12 wherein the drawbar is a telescoping drawbar.

14. A seeding machine as defined by claim 13 wherein the left wing frame is provided with a left link that is coupled to the telescoping drawbar and the eight wing frame is provided with a right link that is coupled to the telescoping drawbar.

15. A seeding machine comprising:

a drawbar defining a longitudinal centerline;

a transversely extending main frame, the main frame is provided with a plurality of planting units, each planting unit comprises an auxiliary hopper for holding seed, a seed meter for metering seed contained in the auxiliary hopper and a furrow opener for forming a planting furrow into which seed metered by the seed meter is deposited;

left and right main seed hoppers for holding seed are mounted to the main frame, the left and right main seed hoppers are transversely separated from one another by a gap along the longitudinal centerline, the gap is provided with a longitudinally extending walkway between the left and right main seed hoppers;

a pneumatic seed on demand delivery system automatically directs seed from the left and right main seed hoppers to the auxiliary seed hoppers of the planting units as needed.

16. A seeding machine as defined by claim 15 wherein the walkway is accessed from behind the planting units.

17. A seeding machine as defined by claim 15 wherein steps extend rearwardly from the walkway.

18. A seeding machine as defined by claim 17 wherein the left and right main seed hoppers are provided with lids that can be accessed from the walkway.

19. A seeding machine as defined by claim 15 wherein the left and right main seed hoppers are provided with lids that can be accessed from the walkway.

20. A seeding machine comprising:

a drawbar defining a longitudinal centerline;

a transversely extending central main frame having a longitudinal centerline, left and right wing frames extend transversely from the central main frame, the central main frame and the left and right wing frames are provided with a plurality of planting units, each planting unit comprises an auxiliary hopper for holding seed, a seed meter for metering seed contained in the auxiliary hopper and a furrow opener for forming a planting furrow into which seed metered by the seed meter is deposited;

left and right main seed hoppers for holding seed are mounted to the main frame, the left and right main seed hoppers are transversely separated from one another by a gap located along the longitudinal centerline, the gap is provided with a longitudinally extending walkway between the left and right main seed hoppers a pneumatic seed on demand delivery system automatically directs seed from the left and right main seed hoppers to the auxiliary seed hoppers of the planting units as needed.

* * * * *